US007953742B2

(12) United States Patent
Jain et al.

(10) Patent No.: US 7,953,742 B2
(45) Date of Patent: May 31, 2011

(54) THREE-PHASE SINGLE-PASS EFFICIENT PROCESSING OF XQUERY UPDATE

(75) Inventors: Uttam Jain, San Jose, CA (US); Henrik Loeser, San Jose, CA (US); Tuong Truong, San Jose, CA (US); Robbert Van der Linden, Scotts Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 11/781,422

(22) Filed: Jul. 23, 2007

(65) Prior Publication Data
US 2009/0030877 A1 Jan. 29, 2009

(51) Int. Cl.
G06F 7/00 (2006.01)
G06F 17/30 (2006.01)
(52) U.S. Cl. ........................................ 707/752; 707/769
(58) Field of Classification Search .................. 707/643, 707/646, 752, 769
See application file for complete search history.

(56) References Cited

U.S. PATENT DOCUMENTS

| 7,013,311 | B2 | 3/2006 | Hui et al. |
| 7,031,956 | B1 | 4/2006 | Lee et al. |
| 7,174,328 | B2 | 2/2007 | Stanoi et al. |
| 2005/0102256 | A1 | 5/2005 | Bordawekar et al. |
| 2006/0129575 | A1 | 6/2006 | Lee et al. |
| 2006/0173927 | A1 | 8/2006 | Beyer et al. |
| 2007/0005657 | A1* | 1/2007 | Bohannon et al. ............ 707/200 |
| 2007/0240034 | A1* | 10/2007 | Sthanikam et al. ........... 715/513 |
| 2007/0240035 | A1* | 10/2007 | Sthanikam et al. ........... 715/513 |
| 2008/0243904 | A1* | 10/2008 | Fan ............................... 707/102 |

OTHER PUBLICATIONS

Shin et al., "A Lightweight XML Repository Supporting Dynamic Partial Update of XML Data", Database Systems for Advanced Applications, DASFAA 2004 Proceedings, pp. 220-225, Mar. 17-19, 2004 Korea.
Braganholo et al., "PATACO: A Framework to Allow Updates Through XML Views", ACM Transactions on Database Systems, vol. 31, No. 3, Sep. 2006, pp. 839-886.
Li et al., "Efficient Evaluation of XQuery over Streaming Data", Proceedings of the $31^{st}$ VLDB Conference, Trondheim, Norway, 2005, pp. 265-276.
Li et al., "Compiler Support for Efficient Processing of XML Datasets", ICS '03, Jun. 23-26, 2003, San Francisco, pp. 42-52.
Yang et al., "Finding Hot Query Patterns Over an XQuery Stream", The VLDB Journal, 13: 318-332, 2004.
Lee et al., "Efficient Evaluation of Multiple Queries on Streaming XML Data", CIKM '02, Nov. 4-9, 2002, McLean VA, pp. 118-125.
Boncz et al., "MonetDB/XQuery: A Fast XQuery Processor Powered by a Relational Engine", SIGMOD 2006, Jun. 27-29, 2006, Chicago IL, pp. 479-490.

* cited by examiner

*Primary Examiner* — Mohammad Ali
*Assistant Examiner* — Patrick A Darno
(74) *Attorney, Agent, or Firm* — Rabindranath Dutta; Konrad Raynes & Victor LLP

(57) ABSTRACT

A system and method is provided for processing XQuery Updates on an Extensible Markup Language (XML) document. The XQuery Updates are processed in three phases. The first phase includes creating a pending update list (PUL) including all update operations to be performed on nodes in a fragment of the Extensible Markup Language (XML) document. The second phase includes sorting the PUL. The third phase includes applying the sorted PUL to each node in the XML fragment during a single traversal of the XML fragment.

17 Claims, 14 Drawing Sheets

```
<!--EMPLOYEES LIST-->
<EMPLOYEES>
<EMPLOYEE ID="1">
<NAME>UTTAM JAIN</NAME>
<POSITION>SOFTWARE ENGINEER</POSITION>
</EMPLOYEE>
<EMPLOYEE ID="2">
<NAME>HENRIK LOESER</NAME>
<POSITION>SOFTWARE ENGINEER</POSITION>
</EMPLOYEE>
</EMPLOYEES>
```

EXAMPLE XQUERY THAT MAKES TUONG TRUONG THE
MANAGER OF ALL EMPLOYEES AND PROMOTES HENRIK LOESER
TO SENIOR SOFTWARE ENGINEER FROM SOFTWARE ENGINEER.

```
FOR $I IN DOC("FOO.XML") RETURN
TRANSFORM
COPY $J:=$I
MODIFY
(
FOR $K IN $J//EMPLOYEE RETURN TO INSERT <MANAGER>
TUONG TRUONG </MANAGER> INTO $K
DO REPLACE VALUE OF $J//EMPLOYEE [NAME="HENRIK
LOESER"]/ POSITION WITH "SENIOR SOFTWARE ENGINEER"
)
RETURN $J:
```

*Fig. 5*

```
ENTERNODE() -- START "DOCUMENT NODE"

EXITNODE() -- END COMMENT NODE "EMPLOYEES LIST"

ENTERNODE() -- START ELLEMENT NODE "EMPLOYEES"
     ENTERNODE() -- START ELEMENT NODE "EMPLOYEE"

ENTERNODE() -- START ATTRIBUTE NODE "ID"
        ADDTEXT()   -- ADD TEXT "1"
        EXITNODE()  -- END ATTRIBUTE NODE "ID"

ENTERNODE() -- START ELEMENT NODE "NAME"
        ADDTEXT()   -- ADD TEXT "UTTAM JAIN"
        EXITNODE()  -- END ELEMENT NODE "NAME"

ENTERNODE() -- START ELEMENT NODE "POSITION"
        ADDTEXT()   -- ADD TEXT "SOFTWARE ENGINEER"
        EXITNODE()  -- END ELEMENT NODE "POSITION"

{   ENTERNODE() -- START ELEMENT NODE "MANAGER"  }
    {   ADDTEXT()   -- ADD TEXT "TUONG TRUONG"       }
    {   EXITNODE()  -- END ELEMENT NODE "MANAGER"    }
```

*Fig. 6*

```
EXITNODE()   -- END ELEMENT NODE "EMPLOYEE"

ENTERNODE()  -- START ELEMENT NODE "EMPLOYEE"

ENTERNODE()  -- START ATTRIBUTE NODE "ID"
    ADDTEXT()    -- ADD TEXT "2"
    EXITNODE()   -- END ATTRIBUTE NODE "ID"

ENTERNODE()  -- START ELEMENT NODE "NAME"
    ADDTEXT()    -- ADD TEXT "HENRIK LOESER"
    EXIT NODE()  -- END ELEMENT NODE "NAME"

{ ENTERNODE()  -- START ELEMENT NODE "POSITION"
  { ADDTEXT()    -- ADD TEXT "SENIOR SOFTWARE ENGINEER" }
  { EXITNODE()   -- END ELEMENT NODE "POSITION"

{ ENTERNODE()  -- START ELEMENT NODE "MANAGER"
  { ADDTEXT()    -- ADD TEXT "TUONG TRUONG" }
  { EXITNODE()   -- END ELEMENT NODE "MANAGER"

EXITNODE()   -- END ELEMENT NODE "EMPLOYEE"

EXITNODE()   -- END ELEMENT NODE "EMPLOYEES"

EXITNODE()   -- END DOCUMENT NODE
```

*Fig. 6*
CONTINUED

| | | |
|---|---|---|
| 1.2.1.X TRUONG</MANAGER> | UPD:INSERTINTO | <MANAGER>TUONG |
| 1.2.2.2.0.X | UPD:REPLACEELEMENTCONTENT | "SENIOR SOFTWARE ENGINEER" |
| 1.2.2.X TRUONG</MANAGER> | UPD:INSERTINTO | <MANAGER>TUONG |

*Fig. 7* apply_update() subroutine performs the phase-3

```
subroutine apply_update(input XML fragment,     // input
                       PUL,                      // input
                       output XML fragment)
```

*Fig. 8 A*

```
|
| Get first node in input XML fragment and push it on a node-stack;
| if next PUL entry is for contex node (i.e. if node-id of contex
node and node-id of next PUL entry matches)
|  | processPULOnNode();
| Else
|  | outputXMLDocumentWriter->enterNode();
| End
| While (true)
|  | If context node has no more children
|  |  | pop the context node from node-stack;
|  |  | If(NOT(popped node contains only text/string))
outputXMLDocument Writer->exitNode();
|  |  | if node-stack is empty then break; // get out of while
|  | Else
|  |  | get next child node;
|  |  | REC_done = false;
|  |  | If (child node is first non-attribute node)
|  |  |  | if (as per node-stack flags - upd:replaceElementContent
and/or upd:insertIntoAsFirst possible for parent node )
|  |  |  |  | processRECAndOrIF(REC_done);
|  |  |  | End
|  |  | End
```

```
|  |  |  | If (REC_done)
|  |  |  | | processPopTimeOperationsAndPop (true)
|  |  |  | | if node-stack is empty then break; // get out of while
|  |  |  | Else
|  |  |  | | push child node on node-stack
|  |  |  | End
|  |  |  |
|  |  |  | If next PUL entry is for context node
|  |  |  | | processPULOnNode();
|  |  |  | Else
|  |  |  | | If contex node contains only text (string value)
|  |  |  | | | outputXMLDocumentWriter->addText();
|  |  |  | | Else
|  |  |  | | | outputXMLDocumentWriter->enterNode();
|  |  |  | | End
|  |  |  | End
|  |  | End
|  | End
|
```

*Fig. 8 A*
CONTINUED

```
subroutine processPULOnNode()
|  nodeStart = false;
|
|  If (PUL has upd:insertBefore operation(s) for contex node)
|  |                           to write new node(s)   (i.e.
enterNode(), addText() and exitNode() for all new nodes)
|  End
|
|  If (PUL has upd:replaceNode operation(s) for contex node)
|  |  if multiple upd:replaceNode operations exist for context node
then raise conflict error.
|  |  Else
|  |  |  Ask outputXMLDocumentWriter to  write new node(s)   (i.e.
enterNode(), addText() and exitNode() for all new nodes)
|  |  |  Skip operation(s) on context node and its descendents in PUL;
do not scip upd:insertAfter on context node though.
|  |  |  goto perform_insert_after;
|  |  End
|  End
|
|  If (PUL has upd:delete operation for context node)
|  |  Skip operation(s) on context node and its descendents in PUL; do
not skip upd:insertAfter on context nodes though.
|  |  goto perform_insert_after;
|  End
```

*Fig. 8B*

```
|
|  If (PUL has upd:rename operations for context node)
|  |  If multiple upd:rename operations(s) exist for context node then
raise conflict error.
|  |  Else
|  |  |   outputXMLDocumentWriter->enterNode(using new name)
|  |  End
|  Else
|  |  outputXMLDocumentWriter->enterNode(using old name)
|  End

|  nodeStarted = true
|
|
|  If (PUL has upd:replaceValueOf operation(s) for context node)
|  |  If multiple upd:replaceValueOf operations(s) exist for context
node then raise conflict error.
|  |  Else
|  |  |  outputXMLDocumentWriter->addText(new value)
|  |  |  Skip operation(s) on context node and its descendents in PUL;
do not skip upd:insertAfter on context node though.
|  |  |  goto preform_insert_after;
|  |  End
|  End
```

*Fig. 8B*
CONTINUED

```
| If (PUL has upd:insertAttributes for context node)
| |  Ask outputXMLDocumentWriter to write new attribute node(s) (i.e.
enterNode(), addText() and exitNode() for all new nodes)
| End
|
| set flag for context node in node-stack: upd:replaceElementContent
and/or upd:insertIntoAsFirst possible for context node.
| goto exit;
|
| LABEL perform_insert_after:
| processPopTimeOperationsAndPop(nodeStarted);
|
| LABEL exit:
```

*Fig. 8 B*
CONTINUED

```
subroutine processPopTimeOperationAndPop(nodeStarted)

| If (as per node-stack flags - upd:replaceElementContent and/or
upd:insertIntoAsFirst possible for context node )
| | processRECAndOrIF(isRECDone);
| End
|
| If (PUL has upd:insertInto or upd:insertIntoAsLast operation(s) for
context node)
| | Ask outputXMLDocumentWriter to write new node(s) (i.e.
enterNode(), addText() and exitNode() for all new nodes)
| End
|
| If (nodeStarted) outputXMLDocumentWriter->exitNode();
|
| If (PUL has upd:insertAfter operation(s) for contex node)
| | Ask outputXMLDocumentWriter to write new node(s) (i.e.
enterNode(), addText() and exitNode() for all new nodes)
| End
|
| pop the context node from node-stack // this will skip traversal of
subtree in input XML fragment, if required.
|
```

*Fig. 8C*

```
subroutine processRECAndOrIIF(isRECDone pass by reference)
|
|  If (PUL has upd:replaceElementContent operation(s) for context node)
|  |  If multiple upd:replaceElementContent operations(s) exist for
context node then raise conflict error.
|  |  Else
|  |  |  outputXMLDocumentWriter->addText(new value)
|  |  |  Skip operation(s) on context node and its descendents in PUL;
do not skip upd:insertAfter on context node though.
|  |  |  isRECDone = true;
|  |  End
|  End
|
|  If (PUL has upd:insertIntoAsFirst operation(s) for context node)
|  |  Ask  outputXMLDocumentWriter  to  write  new  node(s)  (i.e.
enterNode(), addText() and exitNode() for all new nodes)
|  End
|
|  reset flag for context node: upd:replaceElementContent and/or
upd:insertIntoAsFirst possible for context node.
|
```

*Fig. 8 D*

THREE-PHASE SINGLE-PASS EFFICIENT PROCESSING OF XQUERY UPDATE

FIELD OF INVENTION

The present invention generally relates to computer implemented database management systems, and particularly to systems and methods for update processing of documents, or a fragment thereof, written in Extensible Markup Language (XML).

BACKGROUND

XML is a versatile markup language, capable of labeling the information content of diverse data sources including structured and semi-structured documents, relational databases, and object repositories. As increasing amounts of information are stored, exchanged, and presented using XML, the ability to intelligently query XML data sources becomes increasingly important. One of the great strengths of XML is its flexibility in representing many different kinds of information from diverse sources. To exploit this flexibility, an XML query language must provide features for retrieving and interpreting information from these diverse sources. A query language that uses the structure of XML intelligently can express queries across all these kinds of data, whether physically stored in XML or viewed as XML via middleware.

A query language called XQuery, is designed to be broadly applicable across many types of XML data sources. XQuery is designed to meet the requirements identified by the W3C XML Query Working Group. It is designed to be a language in which queries are concise and easily understood. It is also flexible enough to query a broad spectrum of XML information sources, including both databases and documents. For example, XML-enabled database management systems, such as IBM DB2, Oracle DBMS (10 g Release 2), and Microsoft SQL Server allow XML data to be queried using XQuery language. XQuery operates on a data model called the XQuery Data Model. Additional details regarding the XQuery Data Model may be found at http://www.w3.org/TR/xpath-datamodel.

A recent extension to XQuery language called "XQuery Update Facility" allows XML data to be modified (i.e. updated). The XQuery Update Facility, described at http://www.w3.org/TR/xqupdate/, is designed to meet the requirements for updating instances of the XQuery/Xpath Data Model (XDM). The XQuery Update Facility provides facilities to perform any or all of the following operations on an XDM instance: insertion of a node; deletion of a node; modification of a node by changing some of its properties while preserving its identity; and creation of a modified copy of a node with a new identity.

XML data is hierarchical (i.e. structured) and is often represented by a tree of nodes. For example, FIG. 2 shows an exemplary XML document, representing a list of employees by name and position. FIG. 3 shows a node tree representation of the XML document shown in FIG. 2. FIG. 3 shows five different kinds of nodes. The XQuery Data Model actually defines seven kinds of nodes at http://www.w3.org/TR/xpath-datamodel/#Node. The seven kinds of nodes are: document, element, attribute, text, namespace, processing instruction, and comment.

The XQuery Update Facility has defined the following update operations, also called update-primitives, which can be applied to different nodes of an XML document or a fragment thereof:

1. upd:insertBefore—This operation allows one or more nodes to be inserted before the given node.
2. upd:insertAfter—This operation allows one or more nodes to be inserted after the given node.
3. upd:insertInto—This operation allows one or more nodes to be inserted as children of given node.
4. upd:insertIntoAsFirst—This operation allows one or more nodes to be inserted as first children of given node.
5. upd:insertIntoAsLast—This operation allows one or more nodes to be inserted as last children of given node.
6. upd:insertAttributes—This operation allows one or more attribute nodes to be inserted as children of given element node.
7. upd:replaceNode—This operation allows a node to be replaced by one or more nodes.
8. upd:deleteNode—This operation allows a node and all its descendents to be deleted.
9. upd:replaceValueOf—This operation allows value of an attribute/text/processing-instruction/comment node be replaced with a string value.
10. upd:replaceElementContent—This operation replaces non-attribute children of an element with a string value.
11. upd:rename—This operation allows element/attribute/processing-instruction nodes to be renamed.

In accordance with the XQuery Update Facility, update operations on a given input XML fragment are performed in the following phases:

Phase 1: Collect all the update operations in a pending update list, also called a PUL, which is a list of triplets. Each triplet consists of three items: (a) reference to target node, i.e. node to be modified; (b) operation kind (one of the 11 operation kinds described above; and (c) new value, e.g. upd:replaceValueOf, which replaces a node's value with a new string value, or upd:replaceNode, which replaces a node with a new sequence of nodes.

Phase 2: Check the update operations in PUL for compatibility as follows:

A target node cannot participate in two upd:rename operations.

A target node cannot participate in two upd:replaceNode operations.

A target node cannot participate in two upd:replaceValueOf operations.

A target node cannot participate in two upd:replaceElementContent operations.

Phase 3: During this phase update operations are applied on an input XML fragment in multiple passes. Each pass is a traversal of the XML fragment being modified.

Pass 1: All upd:insertInto, upd:insertAttributes, upd:replaceValue, upd:rename, and upd:delete primitives are applied. upd:delete just marks the node for deletion instead of completely deleting it.

Pass 2: All upd:insertBefore, upd:insertAfter, upd:insertIntoAsFirst, and upd:insertIntoAsLast primitives are applied.

Pass 3: All upd:replaceNode primitives are applied.

Pass 4: All upd:replaceElementContent primitives are applied.

Pass 5: All nodes marked for deletion are deleted.

Phase 4: If, as a net result of the above passes, some node contains an adjacent text node children, these adjacent text nodes are merged into a single text node. Note that a text node is a node that encapsulates SML character content. Text has the following properties: it has content; it optionally can have a parent node; and if the parent of a text node is not empty, the text node must not contain the zero-length string as its content.

Additional details of these four phases may be found in the XQuery Update Facility document at http://www.w3.org/TR/xqupdate/, section 3.2.2 upd:applyUpdates.

It will be appreciated by those skilled in the art that applying update operations in four phases is not very efficient. In particular, applying Phase-3 in five passes over the XML document is very inefficient. This inefficiency has a number of disadvantages for the processing of XQuery updates, such as increased computational burden and slower updates.

Accordingly, there is a need for systems and methods for increasing the efficiency of the processing of XQuery Updates so that such updates can be processed faster and with a lower computational burden.

SUMMARY OF THE INVENTION

To overcome the limitations in the prior art briefly described above, the present invention provides a method, computer program product, and system for processing XQuery updates.

In one embodiment of the present invention a method for updating a document comprises: creating a pending update list (PUL) including all update operations to be performed on nodes in a fragment of an Extensible Markup Language (XML) document; sorting the PUL; and applying the sorted PUL to each the node in the XML fragment during a single traversal of the XML fragment.

In another embodiment of the present invention, a method for processing XQuery Updates on an Extensible Markup Language (XML) document comprises: performing a first phase including creating a pending update list (PUL) including all update operations to be performed on nodes in a fragment of the XML document; performing a second phase including sorting the PUL; performing a third phase, including applying the sorted PUL to the XML fragment, during a single traversal of the XML fragment, for each node in the XML fragment, the applying comprising: generating node-events corresponding to the node and operations in the PUL pertaining to the node; and generating an output XML fragment, the output fragment generating a portion of an output document corresponding to one of the update operations in the PUL.

In a further embodiment of the present invention a method for processing XQuery Updates on an Extensible Markup Language (XML) document comprises: performing a first phase including creating a pending update list (PUL) including all update operations to be performed on nodes in a fragment of the XML document; the first phase further comprising assigning node identifiers to each of the nodes in the XML fragment, the node identifiers conveying information regarding the hierarchical relationship between the nodes; performing a second phase including sorting the PUL in semi-document order; and performing a third phase, including applying the sorted PUL to the XML fragment, during a single traversal of the XML fragment, for each node in the XML fragment; the third phase further comprising generating node-events corresponding to the node and operations in the PUL pertaining to the node; the third phase further comprising generating an output XML fragment, the output fragment generating a portion of an output document corresponding to one of the update operations in the PUL; repeating the first, second and third phases for additional XML fragments; and assembling a plurality of the output XML fragments into the output document.

In an additional embodiment of the present invention comprises an article of manufacture for use in a computer system tangibly embodying computer instructions executable by the computer system to perform process steps for processing XQuery Updates on an Extensible Markup Language (XML) document, the process steps comprising: creating a pending update list (PUL) including all update operations to be performed on nodes in a fragment of the XML document; sorting the PUL; and including applying the sorted PUL to the XML fragment, during a single traversal of the XML fragment, for each node in the XML fragment.

Various advantages and features of novelty, which characterize the present invention, are pointed out with particularity in the claims annexed hereto and form a part hereof. However, for a better understanding of the invention and its advantages, reference should be make to the accompanying descriptive matter together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings:

FIG. 5 shows an example of an XQuery with update operations to be performed on the XML document shown in FIG. 2;

FIG. 6 shows node-events for an output XML fragment resulting from the XQuery shown in FIG. 5 in accordance with one embodiment of the present invention;

FIG. 7 shows and example of a pending update list (PUL) for the XQuery shown in FIG. 5 in accordance with one embodiment of the present invention; and FIGS. 8a-8d shows subroutines performed during phase three in accordance with one embodiment of the present invention.

DETAILED DESCRIPTION OF THE INVENTION

Figures 1, 2:
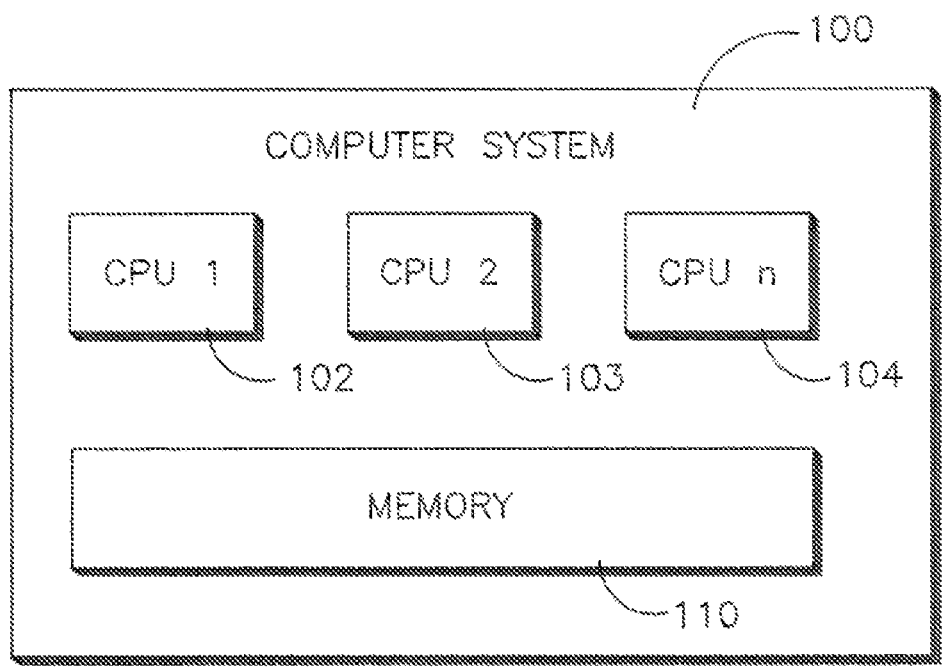
FIG. 1 is a block diagram of a typical computer system wherein the present invention may be practiced.
FIG. 2 shows an example of an XML document containing an employee list in accordance with the prior art.

The present invention overcomes the problems associated with the prior art by teaching a system, computer program product, and method for tracking unauthorized database disclosures. In the following detailed description, numerous specific details are set forth in order to provide a thorough understanding of the present invention. Those skilled in the art will recognize, however, that the teachings contained herein may be applied to other embodiments and that the present invention may be practiced apart from these specific details. Accordingly, the present invention should not be limited to the embodiments shown, but is to be accorded the widest scope consistent with the principles and features described and claimed herein. The following description is presented to enable one of ordinary skill in the art to make and use the present invention and is provided in the context of a patent application and its requirements.

The various elements and embodiments of invention can take the form of an entirely hardware embodiment, an entirely software embodiment or an embodiment containing both hardware and software elements. Elements of the invention that are implemented in software may include but are not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 1 is a block diagram of a computer system 100, in which teachings of the present invention may be embodied. The computer system 100 comprises one or more central processing units (CPUs) 102, 103, and 104. The CPUs 102-104 suitably operate together in concert with memory 110 in order to execute a variety of tasks. In accordance with techniques known in the art, numerous other components may be utilized with computer system 100, such a input/output devices comprising keyboards, displays, direct access storage devices (DASDs), printers, tapes, etc. (not shown).

Although the present invention is described in a particular hardware embodiment, those of ordinary skill in the art will recognize and appreciate that this is meant to be illustrative and not restrictive of the present invention. Those of ordinary skill in the art will further appreciate that a wide range of computers and computing system configurations can be used to support the methods of the present invention, including, for example, configurations encompassing multiple systems, the internet, and distributed networks. Accordingly, the teachings contained herein should be viewed as highly "scalable", meaning that they are adaptable to implementation on one, or several thousand, computer systems.

The present invention provides an efficient technique for applying XQuery update operations in three phases with the third phase needing only a single pass, that is, a single traversal of the XML fragment being modified. In the prior art four phases were required with the third phase requiring five passes.

In accordance with an embodiment of the present invention, XQuery update operations are applied in three efficient phases. Notably phase-3 is done in single pass, which makes it very efficient. Briefly, during first phase all the update operations on different nodes are collected into a PUL. During phase-2 the PUL is sorted in document order. The order is not 100% document order and will be referred to as "semi-document order", which is explained below in more detail. During phase-3 the XML fragment to be modified is traversed, while looking into sorted PUL to generated output XML fragment.

Before phase 1 is performed, node identification numbers (node-ids) are assigned to nodes. In one embodiment of the invention, a node-id is assigned to every node in input XML fragment using the technique for assigning node-ids described in U.S. patent application no. 20060173927, which is hereby incorporated by reference in its entirety. The present inventors have recognized that this node-id technique would be particularly advantageous when used for sorting PUL, as described below. In accordance with this embodiment of the invention, every node in a tree has a node-id digit and a node-id, as described in U.S. patent application no. 20060173927. The root node has node id digit "1" and also node id "1". Children of a node are assigned node-id digits 1, 2, 3 and so on. The node-id of a node is formed by concatenating the parent's node-id and the node's node-id digit. Thus the root node's children will have node-id 1.1, 1.2, 1.3 and so on. Children of a node whose node-id is ni1 will have node-id ni1.1, ni1.2, ni1.3 and so on.

These node ids are encoded such that:

(1) They are binary comparable, that is, if node n1 comes before node n2 in document order, then the binary-comparison between node-id of n1 and node-id of n2 will return the node-id of n1<node-id of n2. This binary comparison is a byte by byte comparison. Binary comparison on node-ids will sort corresponding nodes in document order.

(2) It is possible to generate a binary-comparable node-id of a new node to be inserted between two nodes. Thus given the node-id of a node n1, it is easy to generate a node-id which is bigger than node-ids of n1 and its descendents but smaller than node-id of n1's next sibling. This property is used for sorting PUL in semi-document order.

(3) Node-id digit of attribute nodes are prefixed with a special digit "0". Thus if the node-id of a node n1 is ni1 then n1's attribute children will have node-ids: ni1.0.1, ni1.0.2 and so on; n1's non-attribute children will be ni.1, ni.2, ni.3 and so on. The node-ids of attribute nodes are still binary comparable. This is important because attribute children of a node come before non-attribute children of that node. The node-ids should be ordered accordingly. To illustrate the distinction between attribute nodes and non-attribute nodes, consider the XML construct: <employee id="1">Uttam</employee>. The element node "employee" has two children. The first child is an attribute node id="1". The second child is a text node "Uttam", which is a non-attribute node.

(4) Given node-id of a node n1, it is possible to generate a node-id which is bigger than the node-id of the last possible attribute child of n1 but smaller than the node-id of the first non-attribute child of n1. This new generated node-id is still binary comparable. This property is used for sorting PUL in semi-document order.

Figure 3:
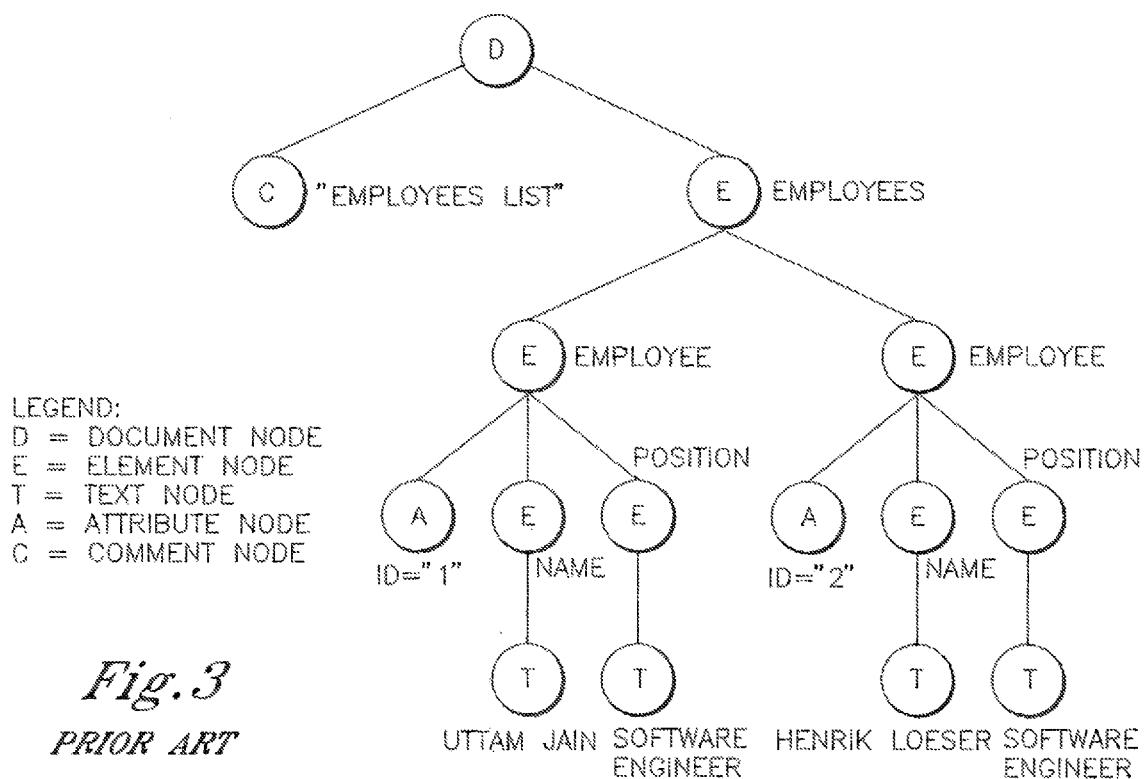
FIG. 3 shows a node-tree representation of the XML document shown in FIG. 2 in accordance with the prior art.
Figure 4:
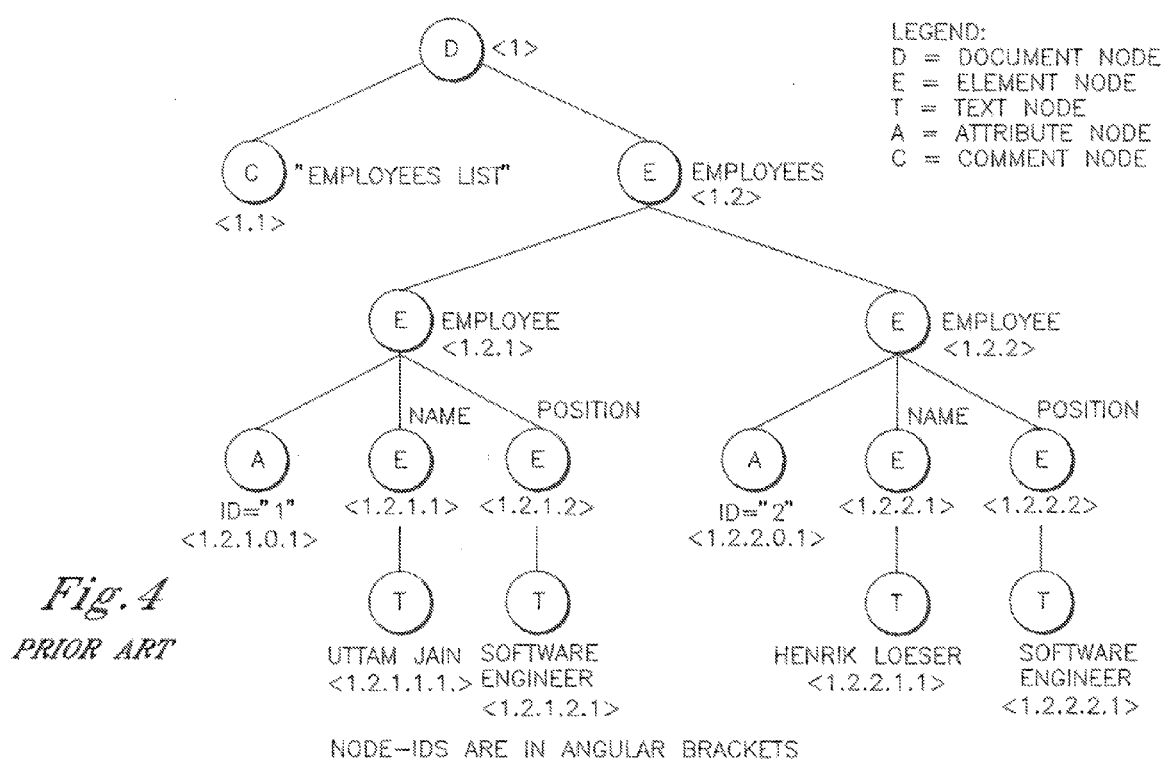
FIG. 4 shows a node-tree representation of the XML document shown in FIG. 2 with node-ids in accordance with the prior art.

U.S. patent application no. 20060173927 also explains the use of a node-id digit "x" which is the highest node-id digit (bigger than any node-id digit) and a way to encode that highest node-id digit. FIG. 4 shows a representation of the node-tree shown in FIG. 3 with node-ids assigned according to this embodiment of the invention.

Special node-id generation is performed as follows:

a. Given a node n1 whose node id is ni1, the node id which is bigger than node-id of n1 and its descendents, but smaller than node-id of n1's next sibling, is ni1.$x$ (. $x$ is a very high digit, as explained in U.S. patent application no. 20060173927).

b. Given a node n1 whose node id is ni1, its attribute children will have node id ni1.0.1, ni1.0.2 and so on, its non-attribute children will have node id ni1.1, ni1.2 and so on. The node id which is bigger than that of all attributes but smaller than that of all non-attribute nodes would be ni1.0.$x$ An XML document can be parsed in streaming fashion by parsing a fragment of it and generating some node-event (also referred to as a method) for that fragment. One example of such node-events is as follows:

enterNode( ): Parser throws this event (in other words calls this method) every time it sees a node. Relevant information e.g. node-kind i.e. element/attribute etc. is passed to the method.

addText( ): Parser throws this event when it sees a text string (value string). Example of these strings are shown in bold: <elem1 a1="a1value">value1</elem1><!—This is comment→ exitNode( ): Parser throws this event when it has finished parsing a node.

These events/methods can be implemented to form a tree of nodes.

In accordance with one embodiment of the invention, a module, called an outputXMLDocumentWriter, implements the above events/methods to generate output XML document as a tree of nodes. In particular, the methods implemented by the outputXMLDocumentWriter include:

outputXMLDocumentWriter module's enterNode( )—This method starts a new node, which could be the child of a previous node started by a previous enterNode( )

outputXMLDocumentWriter module's addText( )—This method adds text to current node outputXMLDocumentWriter module's exitNode( )—This method ends the current node.

FIG. 5 shows an XQuery involving updates. In particular, FIG. 5 shows an example XQuery that makes employee Tuong Truong the manager of all employees and promotes Henrik Loeser to Senior Software Engineer from Software Engineer. FIG. 6 shows the order in which events are thrown to form an output XML fragment. In FIG. 6 note the following: the indentation is shown to describe depth of node-tree (indentation does not mean code blocks); blank lines are shown for readability; code in brackets corresponds to new/changed nodes caused by updates; and document node is a virtual node, which is the root of the XML document.

Note that addText( ) method can be implemented such that if the addText( ) method is called multiple times, then first addText( ) invocation creates the text/string/value node. Next invocations just add more text to the previously opened text/string/value node. This technique avoids need of Phase-4 as required in previous XQuery update processing as described above.

In accordance with one embodiment of the invention, once the node-ids have been assigned as described above, the three phases may be performed, as described below.

Phase-1: Create PUL

During this phase, all update operations to be performed on the XML fragment are collected in form of triplets, discussed above, and inserted in a PUL. A typical usage of XQuery Update in XML-enabled database systems is as follows:

(1) An XML document is inserted into the database system. Generally this causes the XML document to be inserted on disk (permanent storage) as a tree of nodes. In accordance with the present invention, the document is stored as a tree of nodes, where every node is assigned a node-id. An example is shown in FIG. 4, discussed above.

(2) The on-disk XML document (or a fragment thereof) is copied and modified using an XQuery Update statement, such as the example XQuery Update statement shown in FIG. 5. The modified XML fragment can be returned to the end-user, can be stored on disk, or can be fed to another XQuery or XQuery Update construct.

The XQuery Update statement may be processed as follows:

(1) The database system parses the XQuery Update statement.

(2) The database system identifies traversals that need to be performed on the input XML fragment to figure out which nodes are participating in update operations (i.e. which nodes of input XML fragment are the target of update operations). For example, when the query in FIG. 5 is run on the XML document in FIG. 4, the database system needs to do the following traversals: (a) $j//employee and (b) $j//employee[name="Henrik Loeser"]/position. In other words, the database system needs to do one or more traversals on the XML document to extract these nodes: (a) $j//employee, (b) $j//employee[name="Henrik Loeser"]/position. Note that it is possible to do these multiple extractions in single traversal. These traversals will tell the database system that:

(1) $j//employee yields nodes with node-ids 1.2.1 and 1.2.2. Therefore upd:insertInto needs to be performed on nodes with node-id 1.2.1 and 1.2.2. Therefore 2 triplets need to be inserted in the PUL; and (2) $j//employee[name="Henrik Loeser"]/position yields the node with node-id 1.2.2.2. Therefore, upd:replaceValueOf needs to be performed on the node with node-id 1.2.2.2. Therefore one triplet needs to be inserted in the PUL.

Thus, during Phase-1 (create PUL), the database system might need to do one or more traversals on input XML fragment. This has to be done regardless of whether changes need to be applied or not. Note that one traversal (pass) of the XML fragment to be modified is required for applying updates (Phase-3). In this sense it might be noted that the technique of present invention does perform multiple passes (at least two) over the XML fragment being modified. However, the focus of the present invention is on Phase-3, which actually applies the updates. In accordance with embodiments of the present invention, Phase-3 requires only a single-pass, as opposed to multiple-pass required by the XQuery Update Facility specification, as discussed above.

Phase-2. Sort PUL

The PUL is sorted in document order and update operations on each node are sorted in an order according to rules described below. An example PUL for the XQuery shown in FIG. 5 is illustrated in FIG. 7.

The following description is of a special ordering in accordance with one embodiment of the invention for the three operations (update-primitives) in the PUL: upd:insertInto, upd:insertIntoAsLast and upd:insertAfter. The upd:insertIntoAsLast operation(s) on a node are be performed after all but upd:insAfter operations on that node and all operations on its descendents. The upd:insertAfter operation(s) on a node are performed after all operations on that node and its descendents. For this reason, when the triplet entry corresponding to these two operations are put in the PUL, the node-id to be put in the PUL are modified by adding a suffix .$x$ as explained in the previous discussion of special node-id generation. The upd:insertInto operation is processed as if it was upd:insertIntoAsLast, however, upd:insertInto is processed before upd:insertIntoAsLast.

The following description is of a special ordering of the upd:replaceElementContent and upd:insertIntoAsFirst operations in the PUL. The upd:replaceElementContent and upd:insertIntoAsFirst on a node can't be performed before operation on that node's attribute children. For this reason when the triplet entry corresponding to these two operations are put in the PUL, the node-id to be put in the PUL are modified by adding a suffix .0.x as explained the previous discussion of special node-id generation. Update operations are given numbers which allows operations on same node to be processed in a desired order. The numbers are assigned such that:upd:insertBefore<upd:replaceNode<upd:delete<upd:rename<upd:replaceValue<upd:insertAttributes<upd:replaceElementContent<upd:insertIntoAsFirst<upd:insertInto<upd:insertIntoAsLast<upd:insertAfter Thus, the order of operations is as follows:
upd:insertBefore
upd:replaceNode
upd:delete
upd:rename
upd:replace Value
upd:insertAttributes
upd:replaceElementContent
upd:insertIntoAsFirst
upd:insertInto
upd:insertIntoAsLast
upd:insertAfter The PUL is later sorted on two keys. First key is node-id of target node. Second key is update-primitive. The node-ids in the sorted PUL are not precisely in document order because of special sorting of some operations as explained above. This sorting makes the node-id in the PUL in semi-document order. This sort-order of the PUL allows the Phase-3 to be completed in a single-pass of input XML fragment.

Phase-3: Apply PUL

In accordance with one embodiment of the invention, in phase-3 the original XML fragment, which is to be modified or updated, is traversed in document-order. At the same time, we also iterate over the sorted PUL list. The Node-id of every node, which we encounter during traversal, is compared against the target node's node-id in the next PUL entry. If the node-IDs match then node-events (also known as node-methods, as described below) are thrown (called) to generate an output XML fragment which will generate a portion of the output document corresponding to the update operation in the PUL entry. If the node-IDs do not match then node-events are thrown for the current node being traversed. In effect, the document being modified and the modifications are merged.

In more detail, to traverse the original XML fragment in document order, an iterator is used to get the next PUL entry so that the corresponding update operation can be performed. Node-events, as explained above, are generated corresponding to input the XML fragment and the PUL operation. For example, if a node is being deleted then enterNode( ), addText( ) and exitNode( ) will NOT be thrown for that node. If an extra node is being inserted then enterNode( ), addText( ) and exitNode( ) are generated for that extra node.

To traverse the input XML fragment a stack of nodes called node-stack is used. Every item in the stack contains (1) node and (2) flags. Every time we encounter a new node, that node is pushed on the stack. If we are done with a node, that node is popped from the stack. Flags is used for remembering whether a node might have upd:replaceElementContent and/or upd:insertIntoAsFirst operation on it. The node pointed by the top of the node-stack is called the context node.

FIGS. 8A-D show one embodiment of the apply_update( ) subroutine which may perform the phase-3 process in accordance with one embodiment of the invention. In particular, FIG. 8A shows the apply_update( ) subroutine, which contains three subroutines, processPULOnNode( ) shown in FIG. 8B, process RECAndOrIIF shown in FIG. 8D, and process PopTimeOperationsAndPop shown in FIG. 8C.

In accordance with the present invention, systems and methods for the three-phase, single-pass efficient processing of XQuery Updates have been disclosed. Those of ordinary skill in the art will appreciate that the teachings contained herein can be implemented using many kinds of software and operating systems, including, but not limited to, XML-enabled database systems such as relational databases and native SML databases as well as XQuery-enabled middleware such as query gateways, federation, and information integration. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No clam element herein is to be construed under the provisions of 35 U.S.C. section 112, sixth paragraph, unless the element is expressly recited using the phrase "means for" or "step for."

While the preferred embodiments of the present invention have been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

We claim:

1. A method, comprising:
in a first phase, creating a pending update list (PUL) including all update operations to be performed on nodes in a fragment of an Extensible Markup Language (XML) document using a computer processor;
in a second phase, sorting said PUL using the computer processor, wherein said sorting comprises assigning numbers to operations on a node allowing said operations to be processed in a particular order, and wherein said PUL is sorted on a first key that is a node-id and on a second key that is an update primitive, and wherein node-ids in said sorted PUL are not in document order but in semi-document order in response to said allowing of said operations to be processed in said particular order, said semi-document order being established by said node-ids conveying information regarding a hierarchical relationship between said nodes; and
in a third phase, applying said sorted PUL to each said node in said XML fragment during a single traversal of said XML fragment using the computer processor, and wherein said third phase is processed during said single traversal of said XML fragment rather than in multiple traversals, by accessing the node-ids stored in the sorted PUL in semi-document order.

2. The method of claim 1 wherein said applying comprises:
generating node-events corresponding to said node and operations in said PUL pertaining to said node; and
generating an output XML fragment, said output fragment generating a portion of an output document corresponding to one of said update operations in said PUL.

3. The method of claim 2 further comprising:
repeating said creating, sorting and applying for additional XML fragments; and
assembling a plurality of said output XML fragments into said output document.

4. The method of claim 1 wherein said applying further comprises generating a node-stack by adding each new node encountered during said traversal to said node-stack; and removing nodes from said stack after said applying is complete for said nodes.

5. The method of claim 1 wherein said PUL includes a list of triplets, each triplet comprising a reference to a target node identifier, an update operation encoded into a number, and a new value.

6. The method of claim 1 comprising if addText( )method is invoked multiple times, creating a text/string/value node during the first of said addText( )method invocations and adding more text to a previously opened text/string/value node during subsequent said invocations, whereby the merging of adjacent text nodes in instances where some nodes contain adjacent text node children is avoided.

7. The method of claim 1 wherein said particular order of processing said operations is:
upd:insertBefore
upd:replaceNode
upd:delete
upd:rename
upd:replaceValue
upd:insertAttributes
upd:replaceElementContent
upd:insertIntoAsFirst
upd:insertInto
upd:insertIntoAsLast
upd:insertAfter; and
wherein said particular order of processing said operations allows said third phase to be completed during said single traversal of said XML fragment rather than in multiple traversals.

8. The method of claim 1, wherein upd:insertIntoAsLast operations on a selected node are performed after all but upd:insertAfter operations on said selected node and all operations on descendants of said selected node.

9. The method of claim 1, wherein upd:insertAfter operations on a selected node are performed after all operations on said selected node and descendants of said selected node.

10. A computer program product, comprising:
a computer readable storage medium having computer readable program code embodied therewith, said computer readable program code configured to perform operations, the operations comprising:
in a first phase, creating a pending update list (PUL) including all update operations to be performed on nodes in a fragment of an Extensible Markup Language (XML) document using a computer processor;
in a second phase, sorting said PUL using the computer processor, wherein said sorting comprises assigning numbers to operations on a node allowing said operations to be processed in a particular order, and wherein said PUL is sorted on a first key that is a node-id and on a second key that is an update primitive, and wherein node-ids in said sorted PUL are not in document order but in semi-document order in response to said allowing of said operations to be processed in said particular order, said semi-document order being established by said node-ids conveying information regarding a hierarchical relationship between said nodes; and
in a third phase, applying said sorted PUL to each said node in said XML fragment during a single traversal of said XML fragment using the computer processor, and wherein said third phase is processed during said single traversal of said XML fragment rather than in multiple traversals, by accessing the node-ids stored in the sorted PUL in semi-document order.

11. The computer program product of claim 10, wherein said particular order of processing said operations is:
upd:insertBefore
upd:replaceNode
upd:delete
upd:rename
upd:replaceValue
upd:insertAttributes
upd:replaceElementContent
upd:insertIntoAsFirst
upd:insertInto
upd:insertIntoAsLast
upd:insertAfter; and
wherein said particular order of processing said operations allows said third phase to be completed during said single traversal of said XML fragment rather than in multiple traversals.

12. The computer program product of claim 10, wherein upd:insertIntoAsLast operations on a selected node are performed after all but upd:insertAfter operations on said selected node and all operations on descendants of said selected node.

13. The computer program product of claim 10, wherein upd:insertAfter operations on a selected node are performed after all operations on said selected node and descendants of said selected node.

14. A system, comprising:
a memory; and
a processor coupled to the memory, wherein the processor performs operations, the operations comprising:
in a first phase, creating a pending update list (PUL) including all update operations to be performed on nodes in a fragment of an Extensible Markup Language (XML) document using a computer processor;
in a second phase, sorting said PUL using the computer processor, wherein said sorting comprises assigning numbers to operations on a node allowing said operations to be processed in a particular order, and wherein said PUL is sorted on a first key that is a node-id and on a second key that is an update primitive, and wherein node-ids in said sorted PUL are not in document order but in semi-document order in response to said allowing of said operations to be processed in said particular order, said semi-document order being established by said node-ids conveying information regarding a hierarchical relationship between said nodes; and
in a third phase, applying said sorted PUL to each said node in said XML fragment during a single traversal of said XML fragment using the computer processor, and wherein said third phase is processed during said single traversal of said XML fragment rather than in multiple traversals, by accessing the node-ids stored in the sorted PUL in semi-document order.

15. The system of claim 14, wherein said particular order of processing said operations is:
upd:insertBefore
upd:replaceNode
upd:delete
upd:rename
upd:replaceValue upd:insertAttributes
upd:replaceElementContent
upd:insertIntoAsFirst
upd:insertInto
upd:insertIntoAsLast
upd:insertAfter; and wherein said particular order of processing said operations allows said third phase to be completed during said single traversal of said XML fragment rather than in multiple traversals.

16. The system of claim 14, wherein upd:insertIntoAsLast operations on a selected node are performed after all but upd:insertAfter operations on said selected node and all operations on descendants of said selected node.

17. The system of claim 14, wherein upd:insertAfter operations on a selected node are performed after all operations on said selected node and descendants of said selected node.

* * * * *